(12) United States Patent
Gödtner

(10) Patent No.: US 6,745,638 B1
(45) Date of Patent: Jun. 8, 2004

(54) DEVICE MOUNTED ONTO A SLIDER CRANK FOR GENERATING A DISPLACEMENT OF A PART MOUNTED ONTO THE SLIDE IN RELATION TO THE LATTER

(75) Inventor: Werner Gödtner, Reutlingen (DE)

(73) Assignee: WAFIOS Aktiengesellschaft, Reutlingen (DE)

( * ) Notice: Subject to any disclaimer, the term of this patent is extended or adjusted under 35 U.S.C. 154(b) by 0 days.

(21) Appl. No.: 09/914,832

(22) PCT Filed: Jan. 12, 2000

(86) PCT No.: PCT/EP00/00173
§ 371 (c)(1),
(2), (4) Date: Sep. 4, 2001

(87) PCT Pub. No.: WO01/51234
PCT Pub. Date: Jul. 19, 2001

(51) Int. Cl.⁷ ................................................. B21J 13/14
(52) U.S. Cl. ..................... 74/55; 74/44; 74/54
(58) Field of Search ............................... 74/40, 42, 44, 74/51, 54, 55, 579 R; 425/444, 556; 123/197.4; 100/280, 282, 218

(56) References Cited

U.S. PATENT DOCUMENTS

| 1,576,761 A | * | 3/1926 | Hoffman ................... 123/78 R |
| 4,250,730 A | | 2/1981 | Richner |
| 4,334,436 A | | 6/1982 | Bonzack |
| 5,133,314 A | * | 7/1992 | Langstroth ............... 123/197.1 |

FOREIGN PATENT DOCUMENTS

| DE | GM 1864599 | 11/1959 |
| DE | 34 12 147 A1 | 10/1985 |
| DE | 195 21 041 A | 12/1996 |
| JP | 11062649 | 6/1999 |
| WO | 99/11906 | 3/1999 |

* cited by examiner

Primary Examiner—William C. Joyce
(74) Attorney, Agent, or Firm—Renner, Otto, Boisselle & Sklar, LLP

(57) ABSTRACT

A device on a slider crank for generating a motion relative to the a slider (press ram 5) of a part (ejecting spring pin 6) mounted on the slider, wherein such motion is taken off a crankpin (1) upon rotation of the crankpin around a crankshaft axis and transmitted along a pushrod (connecting rod 4) to the part (ejector spring pin 6). For this purpose, revolving parts (wheel 22, 34, 38; disk 98, 100, belt 102; disk 142, 148, belt 150) transmit rotary motion on the connecting rod (26, 28; 144) (FIG. 1).

9 Claims, 3 Drawing Sheets

DEVICE MOUNTED ONTO A SLIDER CRANK FOR GENERATING A DISPLACEMENT OF A PART MOUNTED ONTO THE SLIDE IN RELATION TO THE LATTER

The invention concerns a device on a slider crank for the purpose of generating a motion relative to the slider of a part supported on the slider.

BACKGROUND OF THE INVENTION

For powering an ejector pin on the die of a forming press, it has been a familiar technique for quite some time to introduce, from the outside, a motion into the slide that is reciprocal to the return travel of the press slide in order to eject the workpiece from the pressing die, such as hexagonal head dies, by means of an ejector pin. Due to the many components between the point of introduction of the force and the ejector, such systems are very elastic. In addition, they also usually involve reciprocating movements.

The device known from DE 195 21 041 A1 has the purpose of reducing this mechanical complexity. This device serves for controlling auxiliary devices such as die ejector pins, strippers, or die carriers in an oscillating press ram of single and multi-stage presses. This is accomplished by a cam attached to the crankpin of the crankshaft of a forming press that controls a pushrod sliding inside the connecting rod; via a spring pin, the motion of this pushrod is transferred to the die, causing the tip of the spring pin to eject the workpiece from the die. When the crank performs one revolution, the cam also performs one revolution in relation to the pushrod. The point of contact between the pushrod and the spring pin is in the center of rotation of the bearing pin connecting the connecting rod with the press ram.

In this DE 195 21 041 A1, an oscillating motion is introduced into the slide.

To be sure, DE 34 12 147 A 1 refers to a centric slider crank, with a transmission that also consists of rotating parts (intermediate gear wheel 24, gear wheel 25), but with one gear wheel (25) fixed on a crank pin (16) that rotates in a crank disk (12) with a centric drive shaft (13); however, part of this transmission is a stationary gear wheel (18) that is coaxial in relation to the shaft axis, and also a rotating gear wheel (23) supported on the crank disk (12) that is located between the stationary gear wheel (18) and the rotating gear wheel (25), and meshes with both of them.

That means that a rotary motion of the crank disk (12) causes a rotary motion of the crank arm (15) relative to the rotated crank disk (12), with said motion depending not only on the crank radius but also on the gear ratio (e.g. 2:1) of the stationary gear wheel (18) and the rotating gear wheel (25). Moreover, this familiar type of transmission does not extend, via the crank arm 15, to the slide (4), so that the generation of a motion—relative to the slide—of a part (such as the slide bar 28) supported on the slide (slider) was not part of the considerations at all.

This is also true for DE-GM 1 864 599 (FIGS. 3 and 4) where, in order to produce two superimposed motions of the pushrod (pushrod 9), on the crank side this pushrod is supported by means of an additional cam (8) on a gear wheel (6) on the main cam (crank pin 5), with the gear wheel (6) meshing with a centrically stationary gear wheel (7).

SUMMARY OF THE INVENTION

This invention now addresses the problem of eliminating the disadvantages described above by producing a rotary motion.

Starting with a device of the type referred to at the beginning, the invention solves this problem by means of a slider crank with a device for the purpose of generating a motion relative to a slider of a part supported on the slider, with said motion being taken off a crankpin upon rotation around a crankshaft axis and transmitted along a connecting rod to the part from which an operating motion is taken off, characterized by the feature that in order to generate a rotary motion of that part on the slider around a single axis of rotation relative to both the slider and the connecting rod, a transmission consisting of revolving parts is provided on the connecting rod.

Due to the fact that the rotary motion is transmitted from the crankshaft along the pushrod of the slider crank into the press slide, and that the operating motion is derived directly from this press slide, the invention can be applied universally and makes it possible to transmit large transmission forces in a direct power flow to the operating motion required in each case. Since, except for the tool movement, no additional sliding motions but only rotary motions are involved in transmitting the motion, the device proposed by the invention operates with extremely little wear.

All motions can be produced that can be derived from a rotary motion via appropriate gears.

BRIEF DESCRIPTION OF THE DRAWINGS

The invention is explained in detail on the following pages with the help of the five design variants shown in schematic form by the drawings.

DETAILED DESCRIPTION

Figure 1:
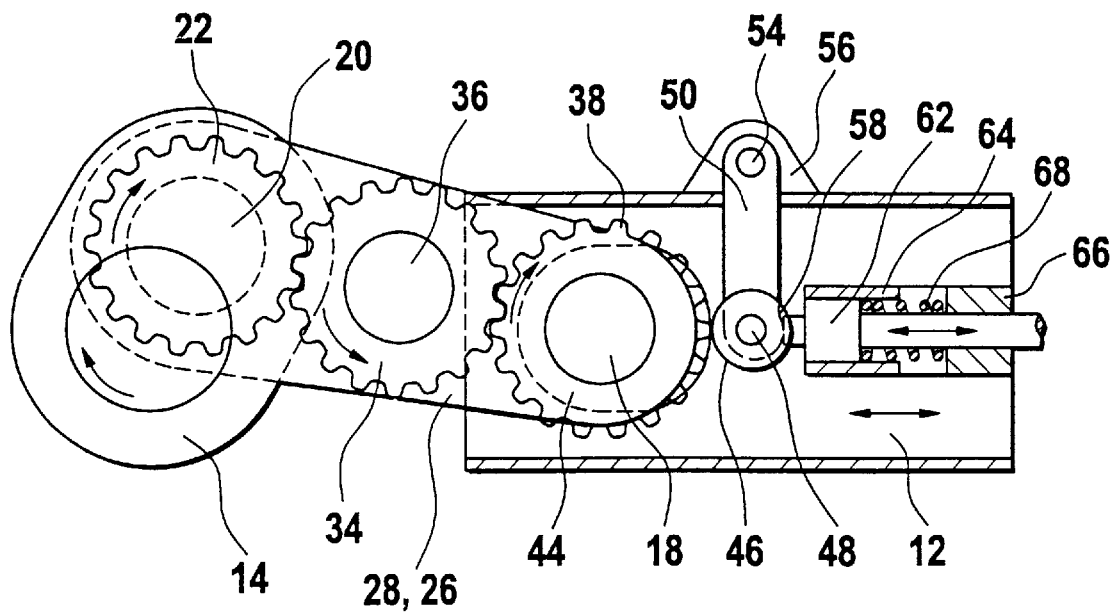
FIG. 1 shows a front view of a first design variant for controlling the ejector pin of a forming press.
Figure 2:
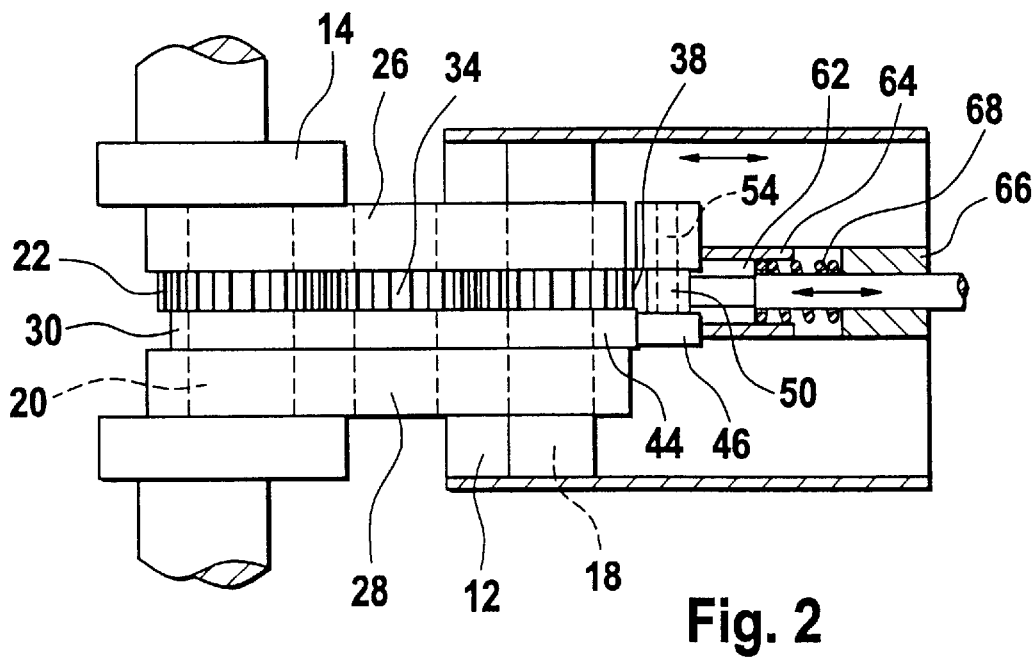
FIG. 2 shows a top view of the design variant in FIG. 1 as a partial view.

FIGS. 1 and 2 show the first design variant of the device proposed by the invention. It serves as the driver for an ejector pin 62 on the die side that is integrated in the crank gear of a single or multiple stage press. Here, a press slide 12 that slides back and forth in a guide has the purpose of producing, by means of slide-mounted forming tools and stationary dies, finished workpieces such as screws, bolts, etc. from blanks in multiple steps.

The press slide 12 is driven by a crankshaft 14 supported by a main crankshaft bearing that is not shown. Via an eccentric crankpin 20, the crankshaft 14 drives two connecting rods 26, 28 that act on a bolt 18 supported in the slide 12. On the crankpin 20 of the crankshaft 14, a stationary drive gear wheel 22 is mounted that rotates in opposition to the connecting rods 26, 28.

In FIG. 2, the connecting rod 26 is located above the drive gear wheel 22. The other connecting rod 28 is located below the gear wheel 22, separated by a spacer bushing 30. The drive gear wheel 22 meshes with an intermediate gear wheel 34 that rotates freely on a pin 36 that is mounted in the connecting rods 26, 28. The intermediate gear wheel 34 meshes with a driving gear wheel 38 that is mounted on a pin 18 at that end of the connecting rods 26, 28 that is opposite of the crankpin 20.

A cam 44 is connected in fixed position to the gear wheel 38 that freely rotates on the pin 18. For the purpose of transmitting a stroke movement, the cam 44 rotating in the press slide 12 acts on a cam roller 46 rotating on a pin 48 that is attached to the lower end of a roller lever 50. The other end of the roller lever 50 pivots on a pin 54 that is mounted in a roller lever bearing 56 on the press slide. With its lateral surface 58, the lower end of the roller lever 50 contacts the ejector pin 62. The ejector pin 62 is driven in an oscillating fashion by the roller lever 50. The ejector pin 62 is supported in a rear bearing bushing 64 and a front bearing bushing 66, with the bearing bushing 66 forming the back rest for a coil spring 68. The force of the coil spring 68 presses the ejector pin 62 and the cam roller 46 against the control cam 44.

Figure 3:
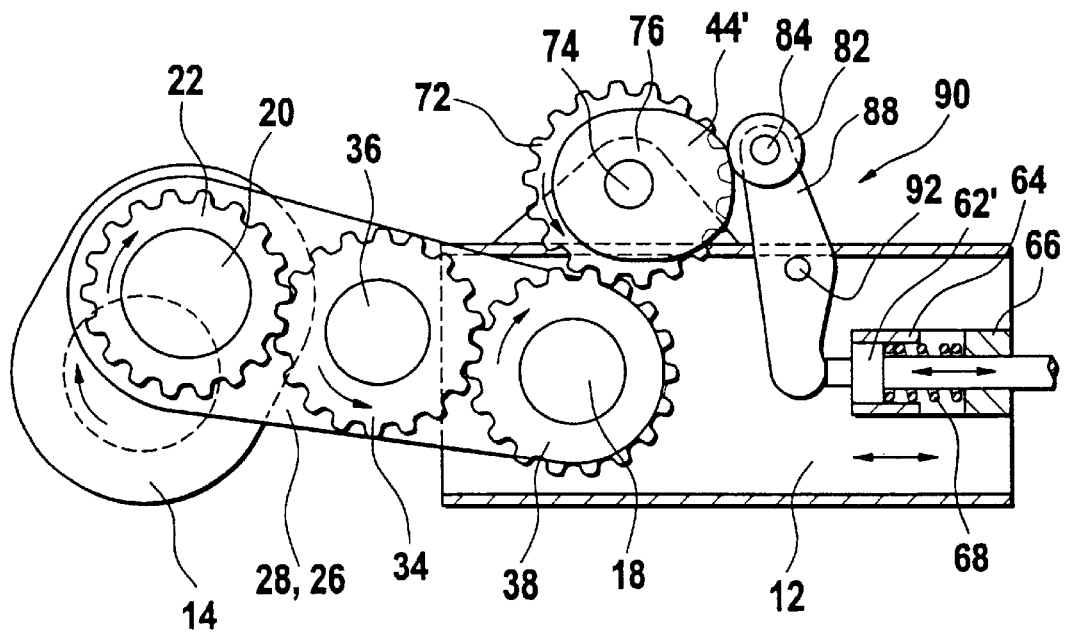
FIG. 3 shows a front view of a second design variant for controlling the ejector pin.

FIG. 3 shows a second, modified design variant of the device proposed by the invention for driving the ejector pin 62 of a forming press that is located on the die side. Here, the driving gear wheel 38 meshes with a driven gear wheel 72 that rotates on a pin 74 above the gear wheel 38, with the pin 74 mounted in a bearing 76 on the press slide 12. In this variant, the cam 44 attached to the driving gear wheel 38 in FIGS. 1 and 2 has been replaced by a cam 44' that is now firmly attached to the driven gear wheel 72. The cam disk 44' acts on a cam roller 82 rotating on a pin 84 that is mounted on an arm 88 of a two-arm roller lever 90. The roller lever 90 itself pivots on a pin 92 on the press slide 12. In order to perform the ejection motion, the free end of the lever 90 acts on an ejector pin 62' whose design and function is identical to that in the first design variant.

Figure 4:
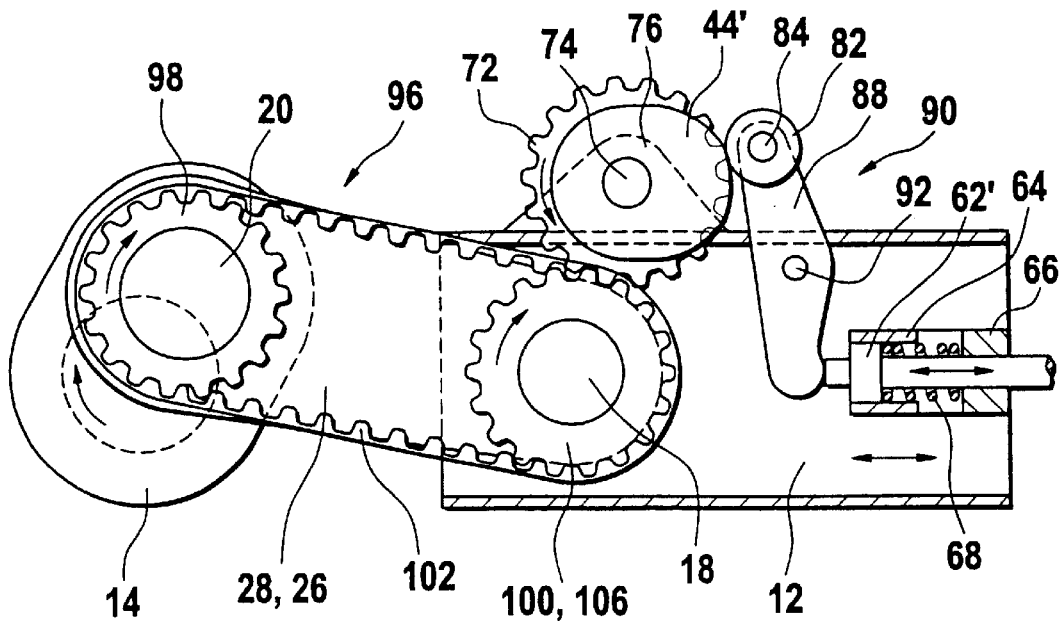
FIG. 4 shows a front view of a third design variant for controlling the ejector pin.

In the design variant shown in FIG. 4, the gear drive 22, 34, 36 of the first and second variant has been replaced by a toothed belt drive 96. Here, instead of the driving gear wheel 22, a toothed driving disk 96 is mounted in fixed position on the crankpin 20 of the crankshaft 14. In alignment with this toothed disk 96, a driven toothed disk 100 rotates on pin 18. A toothed belt 102 connects both toothed disks 98 and 100.

Next to the driven toothed disk 100, a driven gear wheel 106 rotates on the pin 18. The driven gear wheel 106 is attached in fixed position to the driven toothed disk 100, performing the same rotations as the toothed disk 100. Here, the driven gear wheel 106 and the driven toothed disk 100 both have approximately the same exterior diameter. Thus, their outlines coincide in FIG. 4. The driven gear wheel 106 meshes with the gear wheel 72 mounted on the press slide 12, and in terms of location and function, the gear wheel 72 as well as the other components 44', 82 to 92, and 62' to 68 correspond to the device shown in FIG. 3.

Of course, instead of the toothed disks 98 and 100 and the toothed belt 102, it is also possible to use a chain drive consisting of a set of chain sprocket wheels and a chain.

Figure 5:
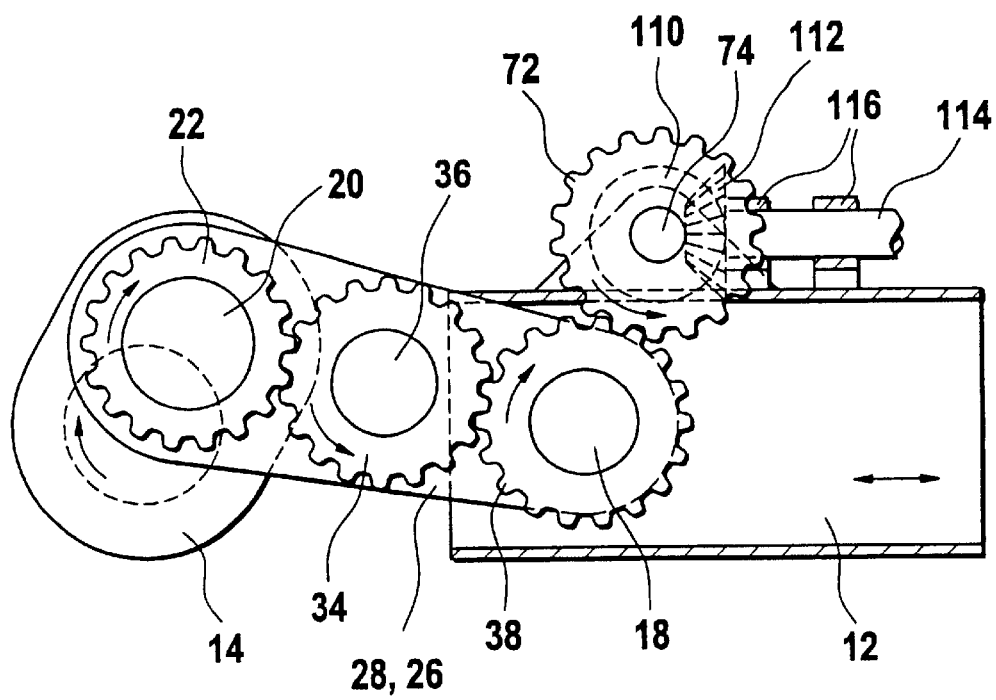
FIG. 5 shows a front view of a fourth design variant for controlling an additional operating motion that is merely indicated.

In the fourth variant shown in FIG. 5, the driven gear wheel 72 is firmly connected with a driving bevel gear 110 that drives a driven bevel gear 112. The driven bevel gear 112 is fixed in position on a shaft 114 that rotates in a bearing block 116 sitting on the press slide 12.

Figure 6:
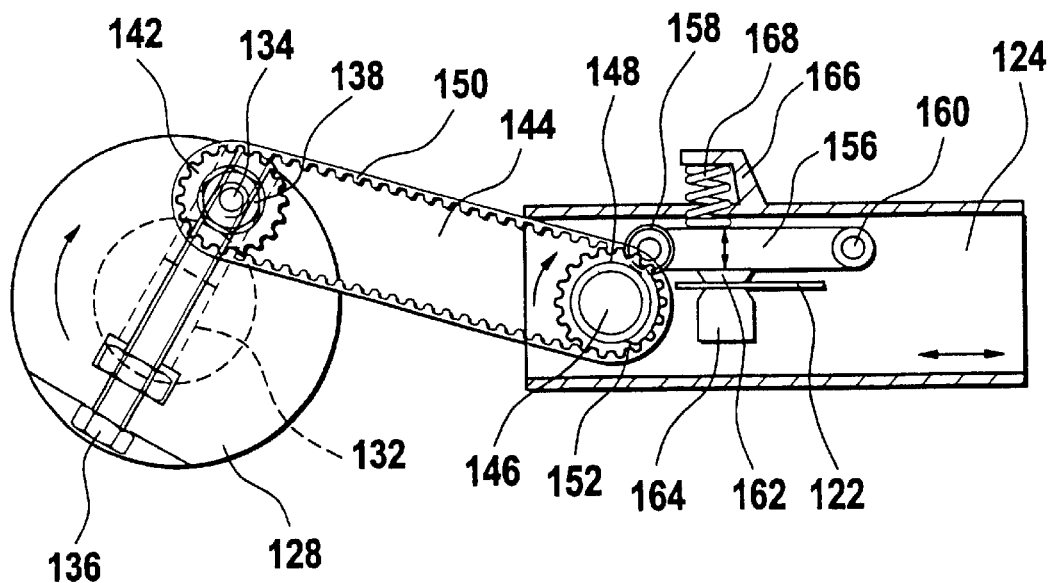
FIG. 6 shows a front view of a fifth design variant for controlling a wire clamping device, as used, for example, in the feeder slide of a wire processing machine.

FIG. 6 shows the fifth design variant of the invention. It serves to clamp wire or strip-shaped material 122 with a slide 124, as used, for example, as a feeder slide of a wire or strip processing machine. This requires an adjustable feeder stroke. In a previously known fashion, the stroke adjustment is achieved by a drive crank 128 that has a T-groove block 130 which, after loosening the nut 138, is adjusted in a T-groove block guide 132 by means of an adjusting screw 136 either away from the center of the drive crank 128 or towards it. The T-groove block 130 is pin-shaped, and, according to FIG. 4, an driving toothed disk 142 is mounted in fixed position on its round section 134 representing the crankpin. In addition, a connecting rod 144 is supported on the round section of the T-groove block 130, and the opposite end of this connecting rod is linked read to the slide 124 by means of the pin 146. A driven toothed disk 148 rotates on the pin 146. A toothed belt 150 connects both toothed disks 142 and 148. A cam disk 152 is mounted in fixed position on the driven toothed disk 148, and this cam disk actuates a roller cam 158 rotating on a roller lever 156. A clamping jaw 162 is connected with the roller lever 156; it clamps the wire or strip 122 to be fed against the counter jaw 164 during the feeding motion of the slide 124, resulting in a wire feed. The clamping force required for this is exerted on the wire 122 via a spring holder 186 attached to the slide 124 by a compression spring 168 that acts on the wire via the roller lever 156. The shape of the cam disk 152 is designed so that the wire 122 is released from the movable clamping jaw 162 during the return motion of the slide.

In all design variants shown here, the gear ratios may be selected as desired.

What is claimed is:

1. A slider crank with a device for the purpose of generating a motion relative to a slider of a part supported on the slider, with said motion being taken off a crankpin upon rotation around a crankshaft axis and transmitted along a connecting rod to the part from which an operating motion is taken off, characterized by the feature that in order to generate a rotary motion of that part on the slider around a single axis of rotation relative to both the slider and the connecting rod, there is provided a transmission comprising at least one rotating part provided directly on the connecting rod.

2. A slider crank according to claim 1, characterized by the feature that the transmission has a driving toothed wheel that is mounted in fixed position on the crankpin, and a driven toothed wheel that is moved forcibly and is mounted on a hinge joint pin that connects the connecting rod and the slider, and the at least one rotating part connects both toothed wheels.

3. A slider crank according to claim 2, characterized by the feature that the at least one rotating part includes a rotating toothed wheel that is mounted on the connecting rod between the driving and driven toothed wheels in mesh with the driving and driven toothed wheels.

4. A method for rotating a toothed wheel, comprising the step of using a slider crank according to claim 2 for rotating the toothed wheel relative to the moving slider, where this toothed wheel that picks up the rotary motion of the driving toothed wheel meshes with the driven toothed wheel or with a coaxial toothed wheel that is connected with the driven toothed wheel in a fixed relationship.

5. Use according to claim 4 where, for the simultaneous turning, relative to the moving slider, of an operating shaft whose axis is parallel to the direction of travel of the slider, the driven toothed wheel and the operating shaft are linked by means of a gear drive.

6. A slider crank with a device for the purpose of generating a motion relative to a slider of a part supported on the slider, with said motion being taken off a crankpin upon rotation around a crankshaft axis and transmitted along a connecting rod to the part from which an operating motion is taken off, characterized by the feature that in order to generate a rotary motion of that part on the slider around a single axis of rotation relative to both the slider and the connecting rod, a transmission comprising at least one rotating part that is provided on the connecting rod; the transmission has a driving toothed wheel that is mounted in fixed position on the crankpin, a driven toothed wheel that is moved forcibly and is mounted on a hinge joint pin that connects the connecting rod and the slider, and the at least one rotating part connects both toothed wheels; and the hinge joint pin carries a cam disk of a cam gear mounted on the slider and that the cam disk is connected in a fixed relationship with the driven toothed wheel.

7. Use of a slider crank according to claim 6 for actuating a device for clamping wire and strip material that is to be fed into a material-processing machine, where said device can be moved by the slider and can be controlled at the same time, and where the cam disk controls, by means of frictional contact, the forced rotation of a cam roller on a spring-mounted roller lever that is mounted in a pivot mount on the slider and carries one clamping jaw of a clamping device whose counter-jaw is mounted in fixed position on the slider.

8. A method for moving a ram, comprising the steps of:

using a slider crank for moving the ram back and forth relative to and simultaneously with the moving slider, the slider crank being characterized by the feature that in order to generate a rotary motion of a part on the slider around a single axis of rotation relative to both the slider and a connecting rod connecting the slider to a crankpin that rotates around a crankshaft axis, a transmission comprising at least one rotating part that is provided on the connecting rod; the transmission having a driving toothed wheel that is mounted in fixed position on the crankpin, a driven toothed wheel that is moved forcibly and is mounted on a hinge joint pin that connects the connecting rod and the slider, and the at least one rotating part connects both toothed wheels; and the hinge joint pin carrying a cam disk of a cam gear mounted on the slider and that the cam disk is connected in a fixed relationship with the driven toothed wheel; and using the cam disk to control, by means of frictional contact, a forced rotation of a cam roller on a roller lever that is mounted in a pivot mount on the slider and acts upon the ram against the return force of a spring.

9. A method for rotating a toothed wheel comprising the steps of:

using a slider crank for rotating the toothed wheel relative to the moving slider, the slider crank being characterized by the feature that in order to generate a rotary motion of a part on the slider around a single axis of rotation relative to both the slider and a connecting rod connecting the slider to a crankpin that rotates around a crankshaft axis, a transmission comprising at least one rotating part that is provided on the connecting rod; the transmission having a driving toothed wheel that is mounted in fixed position on the crankpin, a driven toothed wheel that is moved forcibly and is mounted on a hinge joint pin that connects the connecting rod and the slider, and the at least one rotating part connects both the driving and driven toothed wheels; and the toothed wheel that picks up the rotary motion of the driving toothed wheel meshes with the driven toothed wheel or with a coaxial toothed wheel that is connected with the driven toothed wheel in a fixed relationship; and where, for moving the ram simultaneously back and forth relative to the moving slider, the slider carries a cam disk of a cam gear mounted on the slider, and where this cam disk is connected in a fixed relationship with the toothed wheel and controls, by means of frictional contact, a forced rotation of a cam roller on a roller lever that is mounted in a pivot mount on the slider and acts upon the ram against the return force of a spring.

* * * * *